INVENTOR.
NICHOLAS P. DARASH
BY
Kwis Hudson Boughton & Williams
ATTORNEYS

Patented July 20, 1948

2,445,386

UNITED STATES PATENT OFFICE 2,445,386

MACHINE TOOL

Nicholas P. Darash, Cleveland, Ohio, assignor to The Warner & Swasey Company, Cleveland, Ohio, a corporation of Ohio Application March 5, 1945, Serial No. 581,035

3 Claims. (Cl. 29—48)

This invention relates to a machine tool and more particularly to the mounting for the turret or other indexible part of a machine tool.

In machine tools the indexible turret usually is mounted on a supporting member, such as a turret slide or turret saddle, by means of a center stud which is rotatably arranged in a well or opening in the supporting member. It has been customary to mount the turret so that an annular seating surface on the underside of and adjacent to the circumference of the turret contacts a cooperating surface on the supporting member when the turret is clamped to the supporting member but when the turret is unclamped a slight clearance exists between said cooperating surfaces so that the turret may be indexed freely. The clearance between the said cooperating surfaces of the turret and its supporting member should be just enough to eliminate any frictional drag between said surfaces. If said clearance is insufficient a frictional resistance is created to the rotation of the turret, and if said clearance is too great difficulty may be encountered in properly clamping the turret to the supporting member.

Heretofore it has been difficult to assemble the turret on its supporting member with just the proper clearance between such cooperating surfaces when the turret is unclamped. It has been necessary in the past to mount the turret on its supporting member and remove the same therefrom a number of times to make adjustments which will provide for the correct predetermined amount of clearance. This is true not only in the original assembly of the machine but also when the machine is being serviced.

An object of the invention is to provide in an indexible turret construction improved and novel means for adjusting the turret in an axial direction relative to the supporting member and without necessitating the removal of the turret from its operative assembly on the supporting member, wherefore the correct indexing clearance between the turret and the supporting member can be readily provided quickly, accurately and with a minimum amount of effort and without special tools or equipment both in the original assembly of the machine or in the servicing thereof in the field.

Another object is to provide in an indexible turret construction improved and novel means as referred to in the first mentioned object and wherein the operator can obtain the adjustment of the turret from a position readily accessible to him.

A still further object of the invention is to provide in an indexible turret construction improved and novel means for attaining the correct predetermined slight clearance between the turret and its supporting member when the turret is unclamped to allow free indexing movement of the turret but to enable the turret to be properly and securely clamped to its supporting member when the tools carried by the turret are performing machining operations.

The tools carried by the different faces of an indexible turret of a machine tool frequently are of different size, weight and overhang and this tends to produce an unbalanced or tilted condition of the turret. Especially is this true where the tools are of substantial weight and size as in the case of the larger machines, or wherein a tool may have substantial overhang as, for instance, in the case of a boring bar. The tendency toward an unbalanced condition of an indexible turret may interfere with the free indexing of the turret, since a frictional drag or contact may exist at certain points between the turret and its supporting member.

Another object of the invention is to provide an improved and novel means for mounting an indexible turret on its supporting member so as to be balanced and free from any tendency to tilt notwithstanding uneven disposition of tool weights and the like, wherefore the correct indexing clearance will exist at all points between the turret and its supporting member, thus assuring free indexing movement of the turret.

A further and more general object is to provide a turret construction which facilitates the assembly, maintenance and operation of the turret.

Further and additional objects and advantages residing in the invention will become apparent hereinafter during the detailed description of an embodiment of the invention which is to follow.

Referring to the accompanying drawing illustrating said embodiment,

Figure 1:
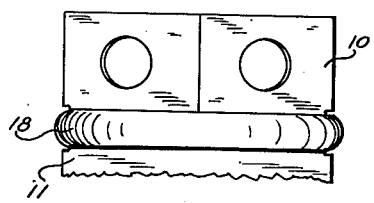
Fig. 1 is an elevational view of an indexible turret of a machine tool and a portion of the supporting member for said turret.
Figure 2:
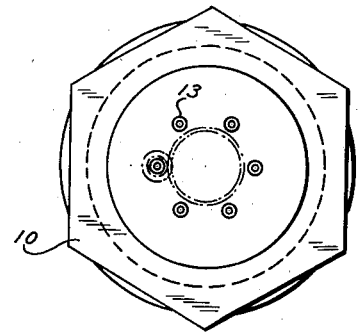
Fig. 2 is a plan view of the turret shown in Fig. 1.
Figure 3:
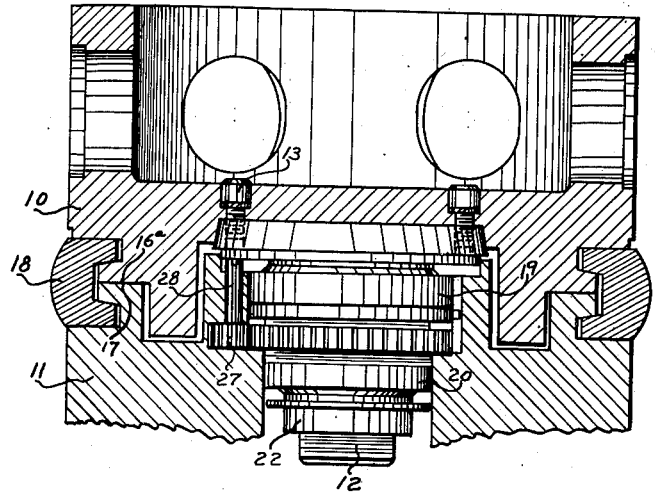
Fig. 3 is a transverse sectional view through the turret and its supporting member with the center stud and the parts mounted thereon shown in elevation.

The turret 10 is shown by way of example as a hex turret on each face of which suitable tools may be mounted as is well understood in the art. The turret 10 is mounted on a supporting member 11 which may be a turret slide, turret saddle or other suitable supporting member and the turret is arranged to have rotative indexing movement on said member so as to bring the tools carried by the various faces of the turret into working position as will be well understood. The indexing movement may be imparted to the turret by any manually or power operated means well known in the art and hence such means has not been illustrated herein.

The turret 10 is provided on its underside with a center stud 12 which may be integral with the turret, or as shown may be formed separately from the turret and secured thereto to facilitate manufacture and assembly. The center stud 12 is secured to the turret by a plurality of circularly arranged and spaced screws 13 which are accessible from the upper side of the turret. The turret 10 outwardly of the center stud 12 is provided with a downwardly extending ring-like portion 14 located in an annular groove 15 of the supporting member 11. Outwardly of the portion 14 the turret has an annular flange 16, the under surface 16a of which contacts and cooperates with the annular surface 17 on the upper side of the supporting member 11 when the turret is clamped to said member. The cooperating surfaces 16a and 17 are slightly spaced apart to provide the correct predetermined clearance therebetween when the turret is unclamped for indexing purposes. The flange 16 and the supporting member 11 are provided with opposed inclined or tapered surfaces with which a clamping ring 18 cooperates to clamp the turret to the supporting member between indexing movements of the turret. The particular clamping means forms no part of the present invention and any suitable form of such means may be employed, but by way of example reference is made to the Burrell et al. Patent 1,446,829, February 27, 1923, as disclosing a suitable form of clamping means for the purpose referred to.

The center stud 12 is provided near its upper end with a combined radial and thrust bearing 19 and adjacent its lower end with a second combined radial and thrust bearing 20. The outer faces of the bearings 19 and 20 are held in spaced relation by a spacer sleeve 21 surrounding the center stud and locating the bearings a substantial axial distance apart on said stud for a purpose later to become apparent. The bearings 19 and 20 prior to the turret being mounted on the supporting member 11 are preloaded by means of an adjusting nut 22 screwed on the threaded lower end of the stud 12 with a grease retainer plate 23 interposed between the nut and the bearing 20.

Figure 4:
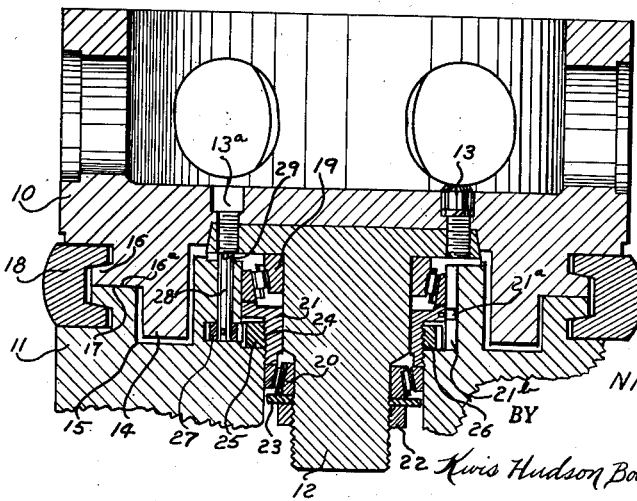
Fig. 4 is a similar view with the center stud and the parts mounted thereon shown in section and with one of the screws which secure the center stud to the turret removed from its tapped opening.

The spacer sleeve 21 is externally threaded as indicated at 24 in Fig. 4 and an adjusting nut 25 is mounted on the threads 24 of the stud. The threads 24 of the spacer sleeve 21 and the threads of the nut preferably are of fine pitch to provide for small increments of axial adjustment of the turret as will later be explained. The spacer sleeve 21 is provided with a projecting element which may be a fixed pin 21a and which when the turret is assembled on the supporting member engages a keyway 21b extending axially of the opening or wall in the supporting member 20.

The sleeve 21 is thus held against rotation relative to the stud 12 and the adjusting nut 25 but can have axial movement relative thereto.

The nut 25 is provided on its circumference with gear teeth 26 which mesh with the teeth of a pinion 27 that is fixed to the lower end of a vertical shaft 28 rotatably carried by the support 11 intermediate the center stud 12 and the ring-like portion 14 of the turret and in a position to be aligned with an opening through the turret, which may be in this instance one of the openings for the screws 13 which secure the turret to the center stud 12. The upper end of the shaft 28 underlies the disk-like upper end of the center stud 12 and is provided with a diametrical slot 29 for a screwdriver or other suitable tool which may be inserted through the opening and used to rotate the shaft 28.

Preferably the center stud 12, bearings 19 and 20, spacer sleeve 21, adjusting nut 25, grease plate 23 and nut 22 are assembled and secured to the turret before the latter is mounted on the supporting member 11. The nut 22 is adjusted to impart the desired preload to the bearings 19 and 20. The turret and the center stud 12 with its associated elements is then positioned on the supporting member 11 with the pin 21a of the sleeve located in the plyway 21b and with the gear teeth 26 of the adjusting nut 25 meshed with the teeth of the pinion 27, after which the clearance between the underside 16a of the turret flange 16 and the surface 17 of the supporting member is tested to see if it is in excess of or is below the correct predetermined indexing clearance.

Assuming that the existing clearance is not the correct indexing clearance, the operator rotates the turret until one of the screws 13 is in alignment with the shaft 28 and removes said screw to provide access to the shaft. For convenience the screw 13 adjacent to the turret face that is in the working position will be the screw which is in alignment with the shaft 28. After such screw 13 has been removed the operator inserts a suitable tool through the threaded opening 13a in Fig. 4 and engages the tool with the slot 29 at the upper end of the shaft 28 and then rotates said shaft in the desired direction to cause the pinion 27 to rotate the adjusting nut 25 and through the fine pitch threads of the nut and sleeve 21 impart axial movement to the spacer sleeve 21 to axially adjust the position of the bearings and stud and to provide the correct predetermined indexing clearance between the surface 16a of the turret flange 16 and the surface 17 of the supporting member.

The turning of the shaft 28 and pinion 27 imparts a slow adjusting rotation to the nut 25 due to the gear ratio between the nut and the pinion and inasmuch as the cooperating threads of the adjusting nut and spacer sleeve 21 are of very fine pitch micrometer axial adjustments can be imparted to the turret thus enabling the correct predetermined indexing clearance to be obtained between the turret surface 16a and the surface 17 of the supporting member. When the adjustment to the correct clearance has been made the screw 13 which has been removed can be rescrewed into its opening.

It will be observed that the adjustment for clearance is accomplished from the upper side of the turret and hence from a position which is readily accessible to the operator. It will also be noted that the adjustment does not necessitate the removal of the turret from the supporting member 11 or require the use of special tools or equipment. Hence the adjustment can be readily accomplished in the original assembly of the machine or in the field in the course of maintenance.

After the correct indexing clearance has been obtained between the turret and the supporting member 11 the clamp 18 is mounted in operative position and when contracted will draw the turret and supporting member toward each other sufficiently to cause the underside 16a of the turret flange 16 to firmly seat against the surface 17 of the supporting member, wherefore the turret will be securely clamped to the supporting member. However, when the clamp 18 is released the correct indexing clearance between the under surface 16a of the flange 16 and the surface 17 of the supporting member is reestablished and the turret may be rotated freely on the bearings 19 and 20.

It will be noted that the bearings 19 and 20 are spaced apart axially of the center stud 12 and thus prevent any tilting of the turret and center stud even though forces are acting on the turret tending to tilt or unbalance the same as, for example, uneven tool weights on the different faces of the turret or stresses set up in the turret due to the cutting operations of the tools.

Although a preferred embodiment of the invention has been illustrated and described herein it will be understood that the invention is susceptible of various modifications and adaptations within the scope of the appended claims.

Having thus described my invention, I claim:

1. In a machine tool, a supporting member having an opening, a turret having a stud, means in said opening for rotatably supporting said stud and including bearings spaced axially of the opening and stud, an externally threaded spacer sleeve interposed between said bearings and within which said stud rotates, means maintaining said sleeve against rotation in said opening but allowing the same to move axially therein, a nut mounted on said externally threaded sleeve and provided on its outer circumference with gear teeth, a pinion carried by said supporting member and meshing with said gear teeth, a shaft having one of its ends operatively connected to said pinion and its opposite end underlying said turret, said turret being provided with an opening affording access to said last mentioned end of said shaft.

2. In a machine tool, a supporting member having an opening, a turret, a stud having an enlarged head underlying said turret, screws securing said turret to said head, means in said opening for rotatably supporting said stud therein and including an externally threaded non-rotatable axially movable sleeve, a nut cooperating with said sleeve, an actuating means for said nut carried by said supporting member and located to underlie said enlarged head and in alignment with one of said screws in each indexed position of said turret, wherefore said one screw can be removed and access afforded to said actuating means so that said nut may be rotated and said sleeve adjusted axially when said turret is mounted on said supporting member to obtain a predetermined indexing clearance between said turret and supporting member.

3. In a machine tool, a supporting member having an opening, a turret having a stud, means in said opening for rotatably supporting said stud and incluing bearings spaced axially of the opening and stud, an externally threaded spacer sleeve interposed between said bearings and within which said stud rotates, means maintaining said sleeve against rotation in said opening but allowing the same to move axially therein, a nut mounted on said externally threaded sleeve and provided on its outer circumference with gear teeth, a gear carried by said supporting member and meshing with said gear teeth, actuating means for said gear connected thereto and underlying said turret, said turret being provided with an opening affording access to said actuating means.

NICHOLAS P. DARASH.

REFERENCES CITED

The following references are of record in the file of this patent:

UNITED STATES PATENTS

| Number | Name | Date |
| --- | --- | --- |
| 1,446,829 | Burrell et al. | Feb. 27, 1923 |
| 1,737,002 | De Vlieg | Nov. 26, 1929 |
| 1,946,439 | Heller | Feb. 6, 1934 |
| 1,953,876 | Burrell | Apr. 3, 1934 |
| 2,135,639 | Gorham | Nov. 8, 1938 |
| 2,369,209 | Bullard et al. | Feb. 13, 1945 |